United States Patent
Cavazzoli et al.

(10) Patent No.: US 7,318,475 B2
(45) Date of Patent: Jan. 15, 2008

(54) MATRIX ACIDIZING HIGH PERMEABILITY CONTRAST FORMATIONS

(75) Inventors: Gustavo Cavazzoli, Rio de Janeiro (BR); Juan Gabriel Blanco, Reynosa (MX); J. Ernest Brown, Katy, TX (US); Pia-Angela Francini, Houston, TX (US); Diankui Fu, Tyumen (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 264 days.

(21) Appl. No.: 11/198,422

(22) Filed: Aug. 5, 2005

(65) Prior Publication Data

US 2006/0000609 A1 Jan. 5, 2006

Related U.S. Application Data

(63) Continuation-in-part of application No. 10/707,022, filed on Nov. 14, 2003, now Pat. No. 7,066,260.

(60) Provisional application No. 60/601,912, filed on Aug. 16, 2004.

(51) Int. Cl.
*E21B 43/27* (2006.01)

(52) U.S. Cl. ............... 166/282; 166/297; 166/300; 166/307; 507/244; 507/245; 507/933

(58) Field of Classification Search ............... 166/281, 166/282, 283, 297, 298, 300, 307; 507/244, 507/245, 267, 933
See application file for complete search history.

(56) References Cited

U.S. PATENT DOCUMENTS

| | | | | |
|---|---|---|---|---|
| 2,756,828 A | * | 7/1956 | Deily | 166/147 |
| 5,322,122 A | * | 6/1994 | Jennings, Jr. | 166/307 |
| 5,551,516 A | * | 9/1996 | Norman et al. | 166/308.2 |
| 6,140,277 A | * | 10/2000 | Tibbles et al. | 507/201 |
| 6,258,859 B1 | | 7/2001 | Dahayanake et al. | 516/77 |
| 6,394,184 B2 | * | 5/2002 | Tolman et al. | 166/281 |
| 6,667,280 B2 | | 12/2003 | Chang et al. | 507/240 |
| 6,828,280 B2 | * | 12/2004 | England et al. | 507/202 |
| 6,929,070 B2 | * | 8/2005 | Fu et al. | 166/308.2 |
| 6,938,693 B2 | * | 9/2005 | Boney et al. | 166/280.1 |

(Continued)

FOREIGN PATENT DOCUMENTS

EP 0278540 8/1992

(Continued)

OTHER PUBLICATIONS

*Choosing a Perforation Strategy*—Charlie Cosad, Oilfield Review, Oct. 1992.

*Primary Examiner*—George Suchfield
(74) *Attorney, Agent, or Firm*—David Cate; Darla Foudeca; Robin Nava

(57) ABSTRACT

A method for stimulating thick or multilayered heterogeneous or homogeneous formations in a single trip without packers involves perforating with tubing conveyed perforation, then injecting a self-diverting acid, then moving the tubing string and perforating at a new location, and then injecting additional self-diverting acid. The sequence may be repeated. The acid is preferably a viscoelastic diverting acid. The self-diverting acid may be alternated with conventional treatment fluid. The job is designed to treat the least permeable zone(s) first and maximizes acid efficiency.

23 Claims, 2 Drawing Sheets

U.S. PATENT DOCUMENTS

| | | | |
|---|---|---|---|
| 7,008,908 B2* | 3/2006 | Chan et al. | 507/225 |
| 7,066,260 B2* | 6/2006 | Sullivan et al. | 166/280.1 |
| 2002/0092650 A1 | 7/2002 | Tolman et al. | 166/298 |
| 2003/0119680 A1 | 6/2003 | Chang et al. | 507/200 |
| 2003/0139298 A1* | 7/2003 | Fu et al. | 507/200 |

FOREIGN PATENT DOCUMENTS

| | | |
|---|---|---|
| WO | 2004/020788 | 3/2004 |

* cited by examiner

MATRIX ACIDIZING HIGH PERMEABILITY CONTRAST FORMATIONS

CROSS REFERENCE TO RELATED APPLICATION

This Application claims the benefit of U.S. Provisional Patent Application No. 60/601,912, filed Aug. 16, 2004, and is a CIP of and also claims the benefit of U.S. patent application Ser. No. 10/707,022, filed Nov. 14, 2003, now U.S. Pat. No. 7,066,260, which is a CIP of U.S. patent application Ser. No. 10/227,690 filed on Aug. 26, 2002, now U.S. Pat. No. 6,938,693.

BACKGROUND OF THE INVENTION

The invention relates to a combination of Tubing Conveyed Perforation (TCP) and acidizing with the use of Viscoelastic Diverting Acid (VDA) for effective matrix stimulation of multiple zones having large permeability contrasts. During matrix acidizing treatment of thick or multi-layered reservoirs, diversion is required to ensure stimulation of the entire interval, especially for carbonate formations. Typically, when acid is injected into such a reservoir, it preferentially enters the more permeable zone or zones or the first zone or zones encountered. At some point, the operator must then stop injection, place a mechanical or chemical diverter to control subsequent leakoff into the already-treated zone, and then resume acid injection. Viscoelastic surfactant (VES) based self-diverting acid systems (VDA) were developed as single fluid systems that stimulate and divert simultaneously for carbonate formations. Such as system has low viscosity as formulated and pumped, but it reduces the chances of forming a dominating wormhole or thief zone when it is injected because it temporarily forms a viscous barrier, which is developed as the acid is spent in the formation, because the fluid undergoes an increase in viscosity as the acid is spent. The viscous barrier forces the following acid into other zones that have lower injectivity so that those zones can also be effectively stimulated. After the acidizing treatment, the viscous barrier breaks down upon contacting produced hydrocarbon, produced water, produced preflush fluids, or postflush fluids, leaving no solid residue to cause formation damage to the rock, because the VES system contains no solids or polymer. This is a very effective treatment for a single zone, especially if it is not thick, and it can also be used in thick zones or multiple zones.

However, during stimulation of thick or multiple zones that have a large permeability contrast, the operator may need to inject more VDA than would be desired in order to form an effective viscous barrier in the high permeability zone(s); this may result in higher job cost and uneven stimulation of the entire interval.

SUMMARY OF EMBODIMENTS OF THE INVENTION

One embodiment of the invention is a method of stimulating a subterranean formation penetrated by a wellbore involving perforating a first zone with a perforation string conveyed on tubing, followed by a first injection step made up of injecting a fluid including a self-diverting acid through the tubing into the first zone. Then the tubing is moved to a second zone, which is then perforated, followed by a second injection step made up of injecting fluid including a stimulation fluid into the second zone. Usually, before treatment the first zone is less permeable than the second zone, and, usually, fluid is not flowed back into the well from the formation between the first injection step and the second injection step. In a typical embodiment, the stimulation fluid in the second step also includes self-diverting acid. In other embodiments, the second injection step is followed by the successive steps of moving the tubing to a third zone and perforating the third zone, then injecting a fluid including a stimulation fluid into the third zone. In that case, generally before treatment the second zone is less permeable than the third zone. Also, generally, in that case fluid is not flowed back into the well from the formation between the second injection step and the step of injecting a fluid including a stimulation fluid into the third zone. In other embodiments, such cycles of perforation and injection are repeated.

In one embodiment, the first zone and the second zone are separated by a substantially impermeable formation layer; in another embodiment, the first zone and the second zone are part of a single producing formation layer.

In one embodiment, the self-diverting acid includes a viscoelastic diverting acid, for example, the self-diverting acid includes a viscoelastic surfactant.

In yet another embodiment, the first injection step includes injecting alternating stages of a fluid including an acid and a fluid including a viscoelastic diverting acid. In still another embodiment, the second injection step includes injecting alternating stages of a fluid containing an acid and a fluid containing a viscoelastic diverting acid. In yet a further embodiment, both injection steps include injecting alternating stages of a fluid containing an acid and a fluid containing a viscoelastic diverting acid.

In one embodiment, the tubing is coiled tubing.

In one embodiment, the stimulation fluid contains an aminocarboxylic acid.

In yet another embodiments, the method also includes injecting one or more other fluids, as examples one or more preflushes, one or more postflushes, and/or one or more spacers. In further embodiments, one or more of the fluids is energized or foamed, or one or more of the fluids is emulsified or delayed.

In additional embodiments, the self-diverting acid includes a betaine and/or an amidoamine oxide.

DETAILED DESCRIPTION OF EMBODIMENTS OF THE INVENTION

Figure 1:
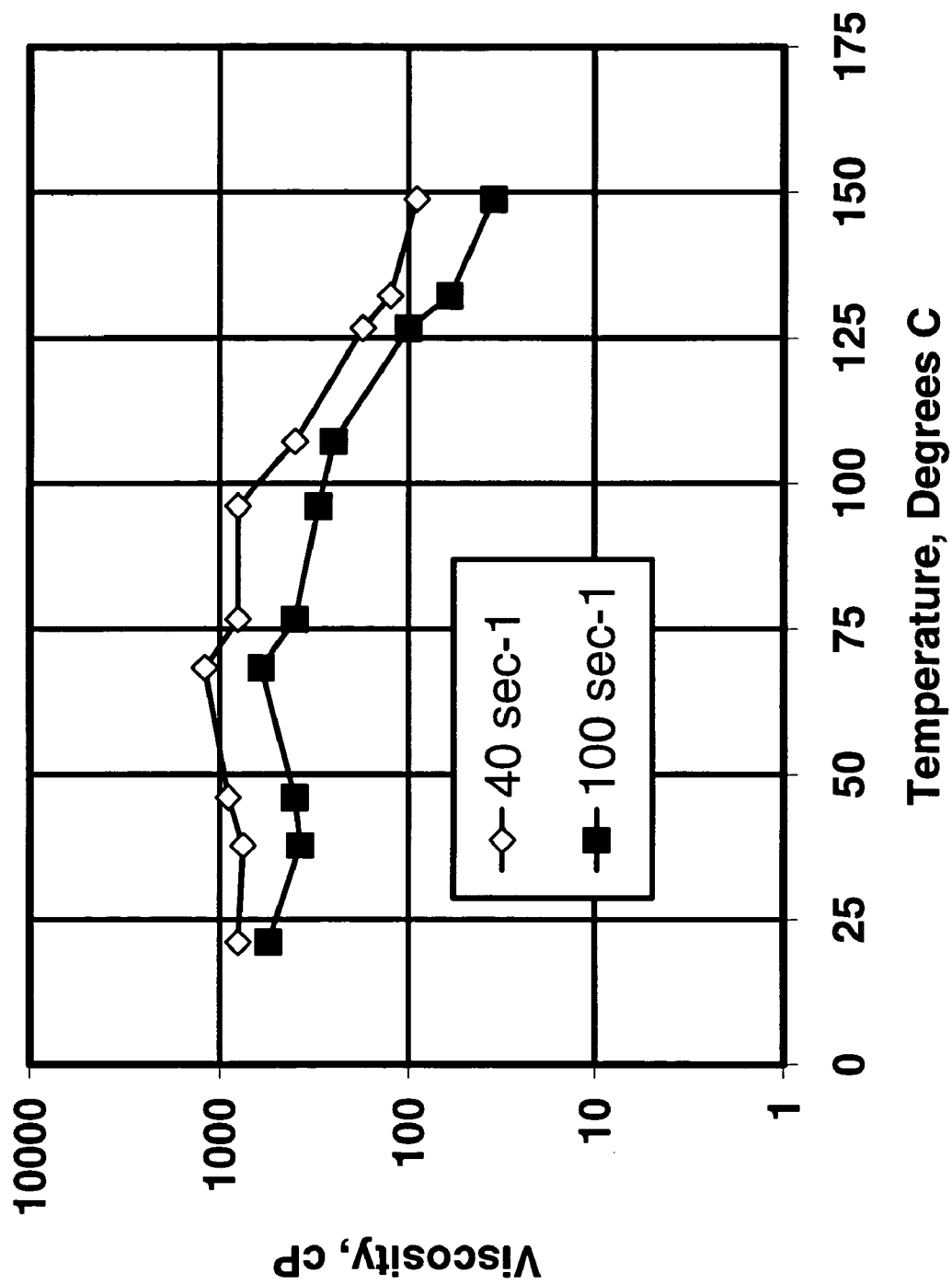
FIG. 1 shows the viscosity of spent VDA fluid as a function of temperature.
Figure 2:
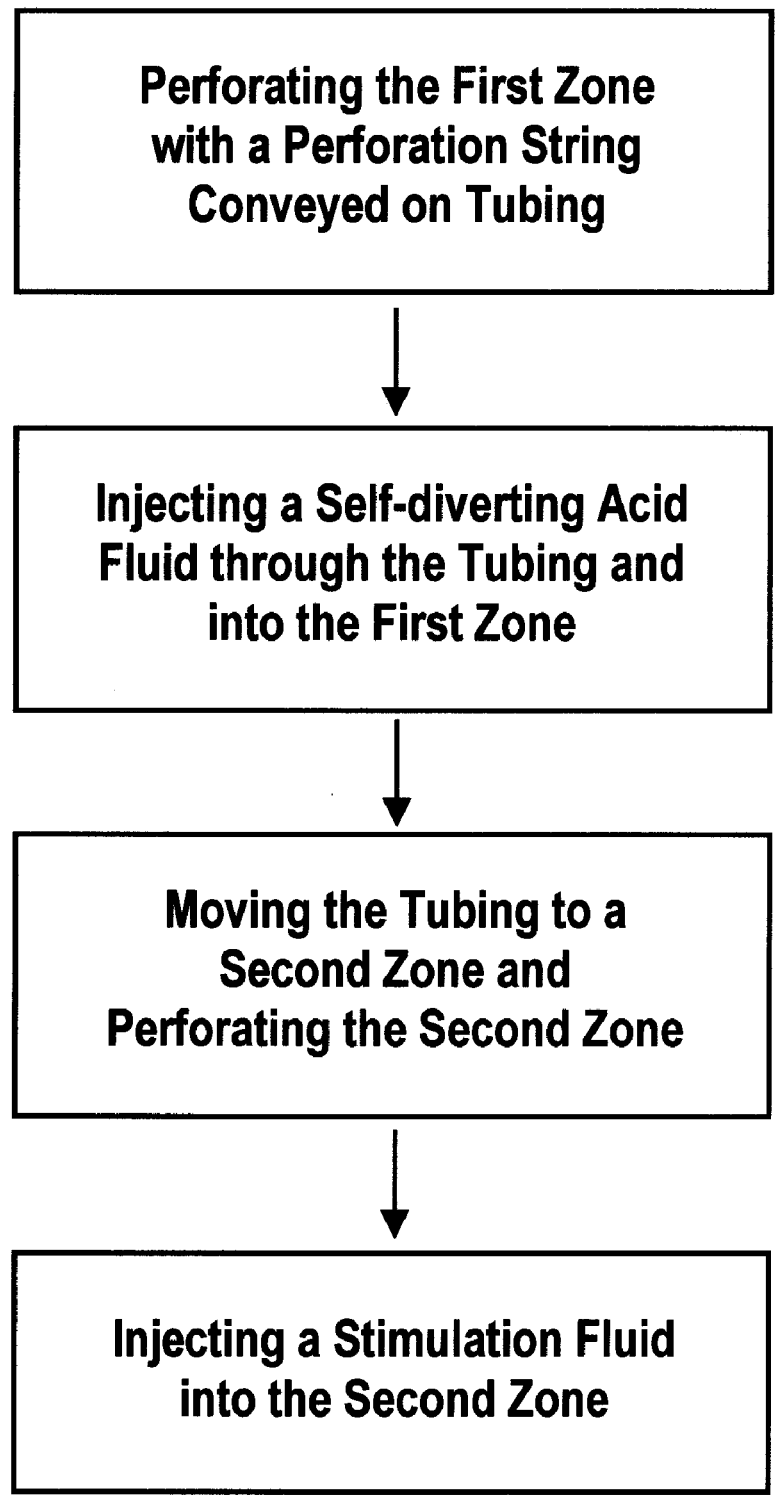
FIG. 2 illustrates the sequential steps and means for treating multi-layered formation in accordance with the invention.

In this discussion, the term "layer" is used to designate a stratum of a subterranean formation; the term "zone" is used to designate a region of a formation to be treated. A zone may be a layer or a portion of a layer. Techniques and materials are described to improve acidizing treatments of multilayer and/or thick (single layer) producing carbonate formations, that have significant permeability contrasts, by maximizing fluid placement by alternating perforation and self-diverting acid stimulation stages. The multilayer carbonate formation may consist of distinct producing formation layers separated by other formation layers, such as non-productive formation layers or impermeable formation layers, for example of different lithology, or it may consist of different regions of a single carbonate sequence. Normally a thick layer will have a range of permeabilities, and the method will be described for that situation. It is possible, however, for a single thick layer to be homogeneous, and the method may be applied in such a situation as well. In either case, either a single thick zone or at least two separate zones are perforated during the single treatment but no zonal isolation is needed and the treatment is performed in a single trip. The term "zone(s)" will be used here to mean "one or more zones"; similarly, in terms like "an other zone" or "another zone" it is to be understood that "zone" is to be interpreted in such phrases as meaning "zone or zones". Furthermore, just as a horizontal zone traversed by a vertical well may be described as "thick" the term may also be used to refer to a similar distance traversed by an inclined or horizontal wellbore in a zone that is actually considered to be thin. Thus, a thick formation means a long production interval.

The process can be made highly efficient with a self-diverting acid system for effective stimulation of each perforated interval in turn (the intervals can be long (or thick, depending upon the orientation relative to the wellbore) and heterogeneous as well, so the self-diverting property is very advantageous) and also provides sufficient leakoff control during one pair, or multiple pairs, of perforation and stimulation treatment steps. In reservoirs having either multiple layers or long production intervals, the rapid buildup of viscosity of the VDA system as the acid is spent creates a temporary barrier that diverts the remaining, or subsequent, fresh acid into the more highly damaged or lower-permeability zone(s). It is the development of viscosity that reduces fluid leak-off and gives the fluid system its self-diverting property to ensure coverage of the entire interval (layer). TCP together with VDA, as an example, can potentially be a highly effective combination in this application. (TCP is Tubing Conveyed Perforation, where the tubing may be coiled or conventional tubing. When the tubing is conventional, jointed, tubing the method generally uses a permanent completion in which the perforation equipment (or "TCP assembly") remains in the well; where the tubing is coiled tubing; the perforation string (or "CT Perforating assembly") is retrieved. The method will generally be used with coiled tubing and will be described in terms of coiled tubing, but it is to be understood that the method is applicable to both types of tubing.) While TCP enables sequential perforation of different intervals, it also allows pumping of VDA though the conveying tubing. VDA, being a highly effective self-diverting acid, also provides good leakoff control after the acidizing treatment of each perforated interval, as the spent VDA is highly viscous, and remains viscous during treatment, even at elevated temperatures. On the other hand, the VDA system is easily pumped through coiled tubing because it has low viscosity as formulated and contains no solids that could make pumping through the tubing difficult or that could cause damage by solids in the newly created conductive channels. Furthermore, after the treatment, the surfactant gel breaks down on contact with, for example, produced oil, or condensate and mutual solvent preflush flowback, or when diluted with produced formation brine during flowback. A preflush or postflush (also called overflush) solution, for example of mutual solvent, enhances the breakdown of the gelled surfactant and promotes quick cleanup. The method eliminates the need for a) mechanical zonal isolation, b) injection of many fluids, c) injection of solids, and d) multiple trips downhole.

In a conventional VDA treatment of a layer in which there is no zonal isolation and all perforations are in fluid communication through the wellbore, the highest permeability region is, by the nature of the conventional treatment, treated first. In the method of the present invention, the lowest permeability region is stimulated first. The tubing conveyed perforation technique is combined with the use of a self-diverting acid fluid system (such as a VDA system) during acidizing to provide effective stimulation of layers (especially multiple layers) having large permeability contrasts, or layers extending over very large intervals. The disclosed process involves alternating stages of tubing conveyed perforation and acid treatment (which may be all VDA or may be VDA following or alternating with other acid), without wasteful pumping of additional fluid into the stimulated zones, after each acid injection, for control of leakoff during succeeding perforation and stimulation stages. The zone or zones are not isolated from one another, for example with packers, and separate diverters are not used. The method results in a much more homogeneous and uniform treatment of the entire thick or multi-zone system. After acidizing, there is usually near wellbore damage, resulting in a skin. Therefore, after the first stimulation step of the new method and then the second perforation step (or after perforation and treatment of a portion of a thick layer followed by perforation of another portion of the layer), there is a stimulated zone with lower skin (preferably negative skin), and an unstimulated damaged zone with higher skin that initially had higher permeability. However, the stimulated zone contains VDA and the injection location has been moved to the unstimulated zone, so the subsequently injected acid and/or VDA goes into the second, unstimulated, zone. If the second zone is the last zone, it may be stimulated with acid alone and no VDA, especially if it is not thick. If the second zone treated is thick, or not the last zone, it should be treated with VDA or with alternating VDA and acid. If the second zone treated is thin, or is the last zone to be treated, it may optionally be treated with acid only and not with VDA, but it is usually preferable to treat with VDA or alternating acid and VDA. Normally, after a perforation step, if the stage is to be treated with acid and VDA, then the first stimulation fluid injected is acid, not VDA, although the first stimulation fluid may be acid if desired.

As has been described, preferably, the lowest permeability zone is treated first. However, it is within the scope of the invention to treat zones in sequence from top to bottom or from bottom to top.

The sequence of perforating and treating (injecting a stimulation fluid) may be repeated as often as necessary. The method may be applied where layers or zones are homogeneous and the permeability contrast is between layers or zones, or where the layers or zones are heterogeneous and the permeability contrast is within layers or zones.

The acid is normally hydrochloric acid but may be any acid or mixture of acids, organic or inorganic, delayed or not, used for carbonate formation stimulation. The concentration is any concentration used for carbonate stimulation. For hydrochloric acid, the concentration range is from about 3% to about 36%, preferably from about 7.5% to about 20%. The acid in the VDA stage(s) is usually the same as the acid in the non-VDA stage(s) but need not be. The "acid" in the non-VDA stage(s) may also be a "non-acidic" stimulation fluid (sometimes called a non-acidic reactive solution or NARS) for example a chelating agent, such as an aminocarboxylic acid, such as ethylenediaminetetraacetic acid (EDTA). Delay may be by any method used to delay acids, for example by forming an emulsion.

TCP has been described in "Choosing a Perforation Strategy", by Charlie Cosad, Oilfield Review, October, 1992. VDA fluid systems have been described in U.S. Pat. No. 6,667,280 and U.S. Patent Application Publication No. 2003/0119680, both hereby incorporated in their entirety. They contain viscoelastic surfactants (VES's), such as those described in those references, and acids, for example hydrochloric acid. Additional surfactants that may be used to form VDA systems are described in U.S. Pat. No. 6,258,859, hereby incorporated in its entirety. Suitable surfactants for formation of VDA systems are, for example, betaines and amidoamine oxides or mixtures of these surfactants. The VDA system of the following examples is made from the concentrate Mirataine BET-E-40, available from Rhodia, Inc. Cranbury, N.J., U.S.A.; it contains an erucic acid amide group (including a C21H41 alkene tail group) and is about 40% active ingredient, with the remainder being substantially water, sodium chloride, and isopropanol. The VDA system (when the surfactant concentrate is diluted for use) typically contains a corrosion inhibitor, an iron stabilizing agent, and a non-emulsifying agent, and may contain other compatible additives as well. The VDA system, including additives, as with all other fluids used, should be checked for compatibility with the formation, formation fluids (especially oil), and other fluids with which it might come into contact.

Because VDA and similar fluid systems are very efficient, they minimize the occurrence of highly branched wormholes and lead to deeper penetration. This helps prevent the reduction in compressive strength that may occur when some formations are acidized; using VDA as the sole treatment fluid (rather than alternating stages of HCl and VDA) may be preferred in such situations.

One of the major advantages of the method of the invention is that the stimulation fluid/diverter fluid is left in the formation during the successive stages of treatment. Treatment/diverter fluid, especially for example the fluid from the first stage, may be left in the formation for a long time. There is no need for removal or flowback of any fluids during any but the last stage; they are non-damaging. Treatment of the zones may be performed one after the other without flowback of each individual zone. Flowback is performed only after the last zone is treated. There is no urgency to remove the diverter fluid or the treatment fluid as quickly as possible, as there might be if it contained polymer. Polymer can be more damaging the longer it remains in a formation. The stimulation fluid injected into each zone acts as the diverting agent for the subsequent treatments without the need for mechanical isolation. Another major advantage is that not all of the diverter fluid must be removed, even at the end of the treatment. Any VES remaining, and not cleaned up, will be non-damaging.

Although, as just explained, there are disadvantages to using polymer-based materials as the diverting agent, a polymer-based self-diverting acid may be used and is within the scope of the invention, although it would not be preferred. An example is described in European Patent Application Publication No. 0 278 540 B1, hereby incorporated by reference in its entirety. The initially strongly acidic system described in that European Patent Application initially has low viscosity but includes a soluble ferric ion source and a polymeric gelling agent that is cross-linked by ferric ions at a pH of about 2 or greater but not at lower pH's. The polymer is, for example, ethanaminium,N,N,N-trimethyl-methyl-oxo-chloride copolymer with propenamide (an anionic polyacrylamide) at temperatures below about 93° C.; or cationic polyacrylamide copolymer at temperatures above about 93° C. This polymer is not cross-linked by ferrous ions. Therefore, the system includes a reducing agent that reduces ferric ions to ferrous ions, but only at a pH above about 3 to 3.5. Consequently, as the acid spends, for example in a wormhole or fracture, and the pH increases to about 2 or greater, the polymer cross-links, and a very viscous gel forms that inhibits further flow of fresh acid into the wormhole or fracture. As the acid spends further (after the treatment) and the pH continues to rise, the reducing agent converts the ferric ions to ferrous ions and the gel reverts to a more water-like state. Hydrazine salts and hydroxylamine salts are most commonly the reducing agents.

EXAMPLE 1

To describe the process, we use an example of a carbonate reservoir that has two distinct zones. The lower permeability zone, for example a 100 mD, 15 m (50 foot) interval, is located at the bottom of the well and a higher permeability zone, for example a 2000 mD, 15 m (50 foot) interval, is located 90 m (300 feet) above the lower permeability zone. The following is the generic job design for such an example (not including among other optional typical steps the usual pre-job procedures for example of wellbore preparation, cleaning, displacement, and logging; or the usual rigging up, testing and placing for example of appropriate perforating, testing, and control tools during the job; and the usual post-job procedures, for example, of displacement (for example with completion brine), rigging down, flow testing, shutting in if appropriate, logging, killing, pulling out and temporary abandonment if appropriate). An example of a completion fluid used with the invention is 7% KCl and 7% $CaCl_2$ and an example of a pickling fluid used with the invention is 15% HCl in water with $H_2S$ scavenger, corrosion inhibitor, iron control agent, and non-emulsifier. Whether or not to include an $H_2S$ scavenger, corrosion inhibitor, iron control agent, and non-emulsifier in any fluid used is dictated by the conditions of the job (and the fluids and formation and chemicals to be encountered) and is readily determined by one of ordinary skill in the art.

1. Perforate the lower zone with TCP.

2. Pump a preflush fluid (in injection mode to serve as an effective breaker for the VDA stage(s) after all the injection is complete and the well is flowed back) followed with a short spacer. The preflush is typically about 23 L/m (about 20 gallons/foot) (but may be less) of 5% ammonium chloride and/or 10% ethylene glycol monobutyl ether or other mutual solvent. If the preflush is, or includes, ethylene glycol monobutyl ether or other mutual solvent, then a spacer (for example about 375 L (about 100 gallons) or more of 5% ammonium chloride) is commonly necessary. Another suitable preflush is 2% or 3% potassium chloride, optionally with mutual solvent. Another particularly suitable preflush is a mixture of mutual solvent (for example 10%) and diesel oil (for example 90%).

3. Pump VDA. Typically about 86 L/m (about 75 gallons/foot) (of VDA or of VDA alternating with HCl) is used to achieve a penetration of about 1 to 1.5 m (about 3 to 5 feet); this of course depends upon the formation porosity and the depth of the damage, if that is the reason for the treatment. The VDA may optionally be energized, for example with 44.5 L N2/L VDA (250 scf/bbl) nitrogen. A suitable HCl concentration is 15%; the useful range of HCl concentrations in VDA's is, for example, from about 10 to about 28%, for example from about 15 to about 28%. The minimum treatment volume is preferably about 46 L/m (about 40 gallons/foot); the maximum treatment volume is about 172 L/m (about 150 gallons/foot), preferably about 86 L/m (about 75 gallons/foot). The zone may optionally be treated with alternating acid/VDA stages.

The actual total volumes/unit wellbore length used, the volumes/unit wellbore length used in each stage, and the volumes/unit wellbore length of diverter and of main treatment fluid, if both are used, (and of flushes, spacers, and displacement fluids) are dependant on many factors such as the zone height, the wellbore angle, the nature and extent of damage, the formation nature and heterogeneity, the presence of natural fissures or fractures, the ability of the fluids to dissolve the formation, and other factors. The pumping schedule is commonly designed with software commercially available from many service companies and consulting companies to obtain the best possible coverage across the entire interval.

If crude oil will be produced, the compatibility of the VDA (and the acid if an acid stage is used) with the crude oil should be checked.

4. Pump a brine spacer, optionally nitrified.
5. Perforate the upper zone (higher permeability zone).
6. Pump a preflush followed by a spacer; similar to step 2.
7. Pump VDA; similar to step 3.
8. Pump a postflush, for example brine with 10% ethylene glycol monobutyl ether. The postflush may optionally be done with diesel or nitrified diesel and may be followed with nitrogen and/or displacement fluid (for example completion brine). The postflush is typically the same fluid as the preflush.
9. Flow back the two zones, preferably as soon as possible.

Note that there is no isolation of the two zones from one another with packers. This procedure provides a more even stimulation of the two zones. The spent VDA in the lower permeability zone provides sufficient leakoff control (see FIG. 1 for typical viscosity as a function of temperature for spent VDA) during perforation and stimulation of the upper zone, resulting in effective stimulation. The zone that initially had the lower permeability becomes the higher permeability zone after stimulation, so it is critical to control fluid leakoff into this zone. This process can also be applied to reservoirs having layers divided into more than two zones; for example, another embodiment involves repeating steps 1 through 4 one or more times. Each perforation step followed by a stage or stages of treatment and/or diverter fluid is called a cycle. This process (one or multiple cycles) may also be applied to different sections of a single layer, or along a zone in a horizontal or sharply deviated well. Nitrogen may optionally be added to the acid stages to energize the fluid and improve the acid cleanup, and nitrogen or a nitrogen foam may also optionally be used to displace fluids between cycles or at the end of treatment. Nitrogen injected early will be more likely to dissipate and not be useful for aiding cleanup, so using nitrogen in the last (or only) cycle or in the last (or only) displacement is preferred. Whether or not nitrogen or nitrogen foam is used or not is based at least in part on how readily the fluids are expected to flow back when the well is turned around; nitrogen or nitrogen foam will be more likely to be used if clean up is expected to be difficult.

Although the method has been described in embodiments without packers, the method may also employ coiled tubing conveyed packers, for example inflatable technology, for example inflatable straddles; any multiple-setting methods may be used that allow controlled staging and treatment of multiple intervals in a single trip.

Although the method has been described here in terms of treatment of vertical hydrocarbon wells in carbonate formations with a self-diverting acid based on a viscoelastic surfactant system, the method may be applied a) to deviated and horizontal wells, b) to other types of wells such as water wells and injection wells, c) to sandstone formations using a self-diverting sandstone acid, and d) with self-diverting acids based on systems other than viscoelastic surfactants, such as polymer-based systems. Although the multiple zones have been described as separated from one another, they may also be contiguous. Although the sequence of steps has been described as a single job, it is within the scope of the invention to stimulate a first zone, then test or produce, and then stimulate one or more additional zones. However, it is preferred not to produce between VDA stages, because produced fluid may reduce the viscosity of the spent VDA. In this case, the stimulation of the first zone might be done with a stimulation fluid other than a self-diverting acid.

EXAMPLE 2

Following is a more detailed example of steps 2 through 4 of the above generic job design for a single 84 m (275 foot) thick perforated carbonate interval. That is, in the method of the invention, comprising the sequential steps of TCP, acidizing with VDA, TCP, acidizing with VDA, etc., this is an example of the procedure that is used between two perforating steps. Assume that the displacement volume is about 12,250 L (about 77 bbl); the well is deviated about 50°; the temperature is about 68° C. (about 155° F.); the pressure is about 21.8 MPa (about 3160 psi); the well will produce both oil and gas; the permeability of the zone is about 100 mD; the formation is about 80% carbonate and 20% sand; the well is expected to produce $H_2S$; and the damage is caused by bentonite estimated to have penetrated about 6 inches into the formation.

The fluids that are used are, for example:

Preflush: 2% KCl and 10% ethylene glycol monobutyl ether in water with $H_2S$ scavenger.

Acid: 15% HCl in water with $H_2S$ scavenger, corrosion inhibitor, iron control agent, and non-emulsifier.

VDA15: 7.5% BET-E-40 in 15% HCl with $H_2S$ scavenger, corrosion inhibitor, iron control agent, non-emulsifier, and methanol.

Overflush: 10% ethylene glycol monobutyl ether and 90% diesel oil.

The surface pumping schedule is, for example, as shown in Table 1.

TABLE 1

| Step | Fluid | Liquid Rate | | Liquid Volume | | Nitrogen | |
|---|---|---|---|---|---|---|---|
| | | bbl/min | L/min | bbl | L | scf/bbl | L/L |
| 1 | Preflush | 2.5 | 397.5 | 60 | 9540 | 0 | 0 |
| 2 | HCl 15% | 2.5 | 397.5 | 40 | 6360 | 0 | 0 |
| 3 | VDA15 | 2.5 | 397.5 | 90 | 14310 | 0 | 0 |
| 4 | HCl 15% | 2 | 318 | 40 | 6360 | 0 | 0 |
| 5 | VDA15 | 2 | 318 | 90 | 14310 | 0 | 0 |
| 6 | HCl 15% | 2 | 318 | 50 | 7950 | 0 | 0 |
| 7 | VDA15 | 1.5 | 238.5 | 80 | 12720 | 0 | 0 |
| 8 | HCl 15% | 1.5 | 238.5 | 50 | 7950 | 0 | 0 |
| 9 | Overflush | 1.5 | 238.5 | 120 | 19080 | 250 | 11125 |

The skin is predicted by computer simulation to be 8.9 before the treatment and −1.1 after the treatment.

EXAMPLE 3

A treatment is performed in a carbonate formation at a depth of about 2700 m in a formation having a net pay (thickness) of about 140 m and a temperature of about 66° C. (about 150° F.). The permeabilities of this single formation range from about 100 mD to about 1000 mD. There is $H_2S$ present.

As explained in Example 1, not all the usual steps, that would be known by one skilled in designing and conducting acidizing treatments, are included in this description. The formation is acidized in two steps. The lower 85 m (first zone) is perforated by Tubing Conveyed Perforation, using production tubing; that zone is then treated with an alternating sequence of HCl and VDA. The tubing is then moved up and the upper 55 m (second zone) is perforated; that zone is then treated with VDA.

The fluids used are:

Perforating Acid: 10% Acetic acid with corrosion inhibitor, iron control agent, and non-emulsifying agent, weighted with KCl to a density of 1.09 kg/L (9.1 lbs/1 gal.).

Acid: 15% HCl in water with corrosion inhibitor, iron control agent, and non-emulsifying agent.

VDA15: 7.5% BET-E-40 concentrate in 15% HCl, with corrosion inhibitor, iron control agent, non-emulsifying agent, and 1 volume % methanol.

Preflush and Overflush: 10% ethylene glycol monobutyl ether and 90% diesel oil by volume.

The treatment of the first zone is done according to the surface pumping schedule shown in Table 2. The coverage of HCl plus VDA is equivalent to about 86.5 L/m (about 75 gal/foot). Displacement is with $N_2$.

TABLE 2

| Step | Fluid | Liquid Rate bbl/min | Liquid Rate L/min | Liquid Volume bbl | Liquid Volume L | Nitrogen scf/bbl | Nitrogen L/L |
|---|---|---|---|---|---|---|---|
| 1 | Preflush | 2 | 318 | 60 | 9540 | 0 | 0 |
| 2 | HCl 15% | 2 | 318 | 30 | 4770 | 0 | 0 |
| 3 | VDA15 | 2 | 318 | 80 | 12720 | 0 | 0 |
| 4 | HCl 15% | 2 | 318 | 30 | 4770 | 0 | 0 |
| 5 | VDA15 | 2 | 318 | 70 | 11130 | 0 | 0 |
| 6 | HCl 15% | 2 | 318 | 30 | 4770 | 0 | 0 |
| 7 | VDA15 | 2.02 | 321.18 | 70 | 11130 | 0 | 0 |
| 8 | HCl 15% | 2.5 | 397.5 | 30 | 4770 | 0 | 0 |
| 9 | Overflush | 2.7 | 429.3 | 120 | 19080 | 0 | 0 |
| 10 | Displacement | 0 | 0 | 0 | 0 | 3540 | 157530 |

The treatment of the second zone is done according to the surface pumping schedule shown in Table 3. The coverage of VDA is equivalent to about 46 L/m (about 40 gal/foot). Displacement is with brine (weighted with KCl to a density of 1.09 kg/L (9.1 lbs/1 gal.)).

TABLE 3

| Step | Fluid | Liquid Rate bbl/min | Liquid Rate L/min | Liquid Volume bbl | Liquid Volume L |
|---|---|---|---|---|---|
| 1 | Preflush | 1.5 | 238.5 | 45 | 7155 |
| 2 | VDA15 | 1.5 | 238.5 | 174 | 27666 |
| 3 | Overflush | 1.5 | 238.5 | 20 | 3180 |
| 4 | Overflush | 1.5 | 238.5 | 15 | 2385 |
| 5 | Displacement | 1.56 | 248.04 | 100 | 15900 |

The skin after treatment is about −4.5 in both zones.

What is claimed is:

1. A method of stimulating a subterranean formation penetrated by a wellbore comprising the steps of perforating a first zone with a perforation string conveyed on tubing, then a first injection step comprising injecting a fluid comprising a self-diverting acid through said tubing into said first zone, then moving said tubing to a second zone and perforating said second zone, then a second injection step comprising injecting a fluid comprising a stimulation fluid into said second zone.

2. The method of claim 1 wherein before treatment said first zone is less permeable than said second zone.

3. The method of claim 1 wherein fluid is not flowed back into the well from the formation between the first injection step and the second injection step.

4. The method of claim 1 wherein said stimulation fluid comprises a self-diverting acid.

5. The method of claim 4 wherein said second injection step is followed by the successive steps of moving said tubing to a third zone and perforating said third zone, then injecting a fluid comprising a stimulation fluid into said third zone.

6. The method of claim 5 wherein before treatment said second zone is less permeable than said third zone.

7. The method of claim 5 wherein fluid is not flowed back into the well from the formation between the second injection step and the step of injecting a fluid comprising a stimulation fluid into said third zone.

8. The method of claim 1 wherein said first zone and said second zone are separated by a substantially impermeable formation layer.

9. The method of claim 1 wherein said first zone and said second zone are part of a single producing formation layer.

10. The method of claim 1 wherein the self-diverting acid comprises a viscoelastic diverting acid.

11. The method of claim 10 wherein the viscoelastic diverting acid comprises a viscoelastic surfactant.

12. The method of claim 1 wherein the first injection step comprises injecting alternating stages of a fluid comprising an acid and a fluid comprising a viscoelastic diverting acid.

13. The method of claim 1 wherein the second injection step comprises injecting alternating stages of a fluid comprising an acid and a fluid comprising a viscoelastic diverting acid.

14. The method of claim 1 wherein both injection steps comprise injecting alternating stages of a fluid comprising an acid and a fluid comprising a viscoelastic diverting acid.

15. The method of claim 1 wherein said tubing is coiled tubing.

16. The method of claim 1 wherein said stimulation fluid comprises an aminocarboxylic acid.

17. The method of claim 1 further comprising injecting one or more preflushes after the perforating a first zone and prior to the first injection step.

18. The method of claim 1 further comprising injecting one or more postflushes after the first injection step.

19. The method of claim 17 further comprising injecting one or more spacers after injecting one or more preflushes.

20. The method of claim 1 wherein one or more of the fluids is energized or foamed.

21. The method of claim 1 wherein the self-diverting acid is emulsified or delayed.

22. The method of claim 1 wherein said self-diverting acid comprises a betaine.

23. The method of claim 1 wherein said self-diverting acid comprises an amidoamine oxide.

* * * * *